No. 612,857. Patented Oct. 25, 1898.
G. T. MACKLEY.
SUPPORTING ATTACHMENT FOR BICYCLES.
(Application filed Mar. 7, 1898.)

(No Model.)

WITNESSES.
Alfred H. Broad.
William H. James

INVENTOR.
George Thomas Mackley.
per. Robert E. Phillips
Attorney.

THE NORRIS PETERS CO., PHOTO-LITHO., WASHINGTON, D. C.

UNITED STATES PATENT OFFICE.

GEORGE THOMAS MACKLEY, OF LONDON, ENGLAND.

SUPPORTING ATTACHMENT FOR BICYCLES.

SPECIFICATION forming part of Letters Patent No. 612,857, dated October 25, 1898.

Application filed March 7, 1898. Serial No. 673,001. (No model.)

*To all whom it may concern:*

Be it known that I, GEORGE THOMAS MACKLEY, a subject of the Queen of Great Britain, residing at Lee, London, in the county of Kent, England, have invented a new and useful Improvement in and Relating to Bicycles, (for which I have obtained Letters Patent of Great Britain, No. 22,535, bearing date of October 1, 1897,) of which the following is a full and complete specification.

This invention relates to an apparatus or device for attachment to bicycles of the rear-driving safety type to transform such machines into machines of stable or approximately stable equilibrium, the primary object being to enable riders to mount and dismount or remain seated on such machines when at a state of rest.

Figure 1:
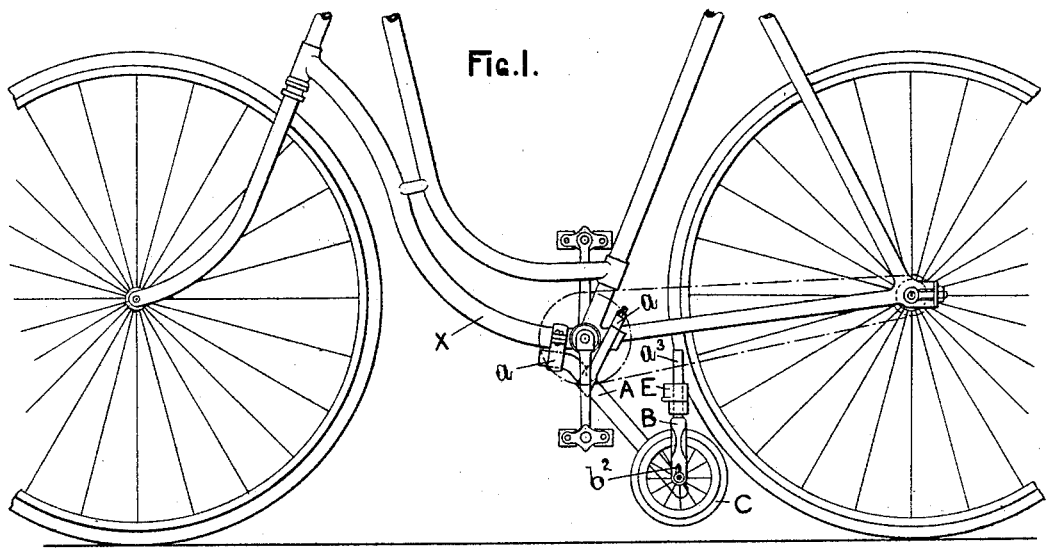
Figure 2:
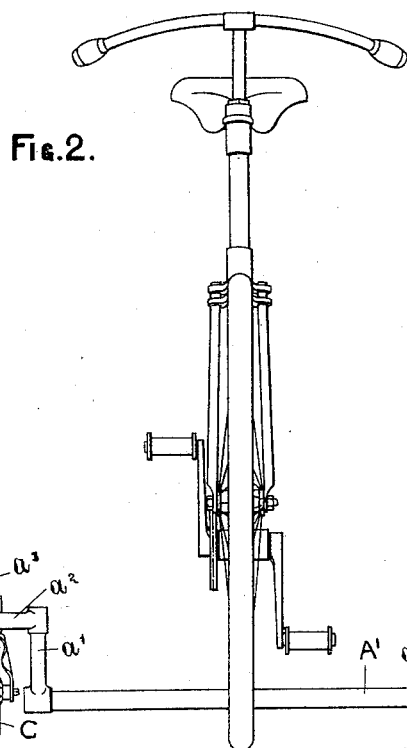
Figure 3:
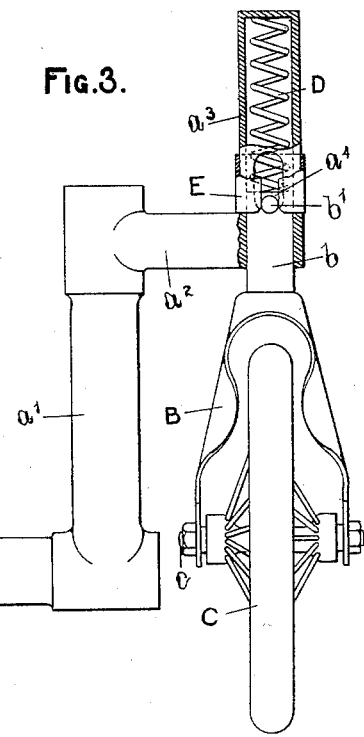

In the accompanying drawings, which illustrate this invention, Figure 1 is a view in side elevation of a bicycle fitted with the apparatus. Fig. 2 is a view in front elevation thereof; and Fig. 3 is a view, on an enlarged scale, showing details of construction.

Throughout the views similar parts are marked with like letters of reference.

The apparatus consists, essentially, of a frame of an inverted-T shape adapted to be attached or fixed to the frame of the bicycle at or near the pedal-crank axle and carrying small wheels at such a distance from the center of the machine as will place them exterior to the paths of the pedals. The inverted-T-shaped frame consists of a vertical member A, which is provided with clip-sockets, such as $a$ and $a$, to enable it to be clamped to the frame X of any machine in close proximity to the pedal-crank-axle bracket.

At each end of the horizontal member $A'$ of the T-shaped frame is a vertical or approximately vertical arm $a'$. These arms support short horizontally-arranged arms $a^2$, each carrying a socket $a^3$, in which slides the stem $b$ of a fork B, carrying a wheel C. The stems $b$ of the forks B are supported in the sockets $a^3$ by spiral springs D, contained in the said sockets, so as to allow the said wheels to rise and fall to a limited extent, which is preferably defined by means of dowel-pins $b'$ or their equivalents carried by the stem $b$, sliding in slots $a$ in the said sockets.

The upper ends of the slots $a^4$ are widened, as shown by Fig. 3, to permit the stems $b$ of the forks B turning radially in the sockets $a^3$ to allow the wheels C to accommodate themselves to the curves the bicycle may be running in when said supporting-wheels are in contact with the ground.

To restore the wheels C to their normal positions parallel to the driving-wheel of the bicycle after deflection and immediately they are clear of the ground, a circular plate-spring E is so fixed to each of the sockets $a^3$ as to engage with the dowel-pins $b'$, as shown by Fig. 3.

The wheels C are so mounted in the forks B that their vertical positions can be adjusted to enable them either to run on the ground or to be clear thereof, as shown in the drawings. To this end, the axles $c$ of the wheels C are mounted in slots $b^2$ in the ends of the forks B.

Although the apparatus is hereinbefore described and illustrated in the accompanying drawings as being fixed to the frame of a bicycle by clips or their equivalents, it may be permanently fixed thereto by forming the member A in one with the frame X or by brazing or otherwise permanently fixing it to the pedal-crank-axle bracket.

I am aware that bicycles have already been fitted with laterally-arranged supports for retaining them in an upright position, and I therefore do not broadly claim the use of such lateral supports; but What I do claim as my invention, and desire to secure by Letters Patent, is—

An apparatus for supporting a bicycle and transforming it into a machine of stable or approximately stable equilibrium, consisting of a frame of an inverted-T shape attached to the frame of the bicycle at or near the pedal-crank-axle bracket, the said frame having short vertical arms at the end of its lateral member the said arms carrying vertical sockets exterior to the path of the pedals, of wheels carried in forks the stems of which slide in the sockets carried by the T-shaped frame, of springs contained within the said sockets and supporting the stems of the forks carrying the supporting-wheels of means of confining the stems of the forks in the sockets, and of springs acting on the stems of the forks to restore the wheels to their positions parallel to the driving-wheel of the bicycle after deflection, as set forth.

GEORGE THOMAS MACKLEY.

Witnesses:
ROBERT E. PHILLIPS,
WILLIAM H. JAMES.